United States Patent
Petrovic et al.

(10) Patent No.: US 10,752,511 B2
(45) Date of Patent: Aug. 25, 2020

(54) ZEOLITE MATERIALS AND METHODS OF MANUFACTURE

(71) Applicant: BASF CORPORATION, Florham Park, NJ (US)

(72) Inventors: Ivan Petrovic, Princeton, NJ (US); Ahmad Moini, Princeton, NJ (US); Bettina Zoellner, Ruppertsberg (DE); Christian Holtze, Mannheim (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/554,724

(22) PCT Filed: Mar. 18, 2016

(86) PCT No.: PCT/US2016/023009
§ 371 (c)(1),
(2) Date: Aug. 31, 2017

(87) PCT Pub. No.: WO2016/153950
PCT Pub. Date: Sep. 29, 2016

(65) Prior Publication Data
US 2018/0072579 A1    Mar. 15, 2018

Related U.S. Application Data

(60) Provisional application No. 62/135,737, filed on Mar. 20, 2015.

(51) Int. Cl.
| | |
|---|---|
| *C01B 39/54* | (2006.01) |
| *C01B 39/48* | (2006.01) |
| *B01J 29/70* | (2006.01) |
| *B01J 29/84* | (2006.01) |
| *B01J 29/85* | (2006.01) |
| *C01B 39/04* | (2006.01) |
| *B01J 13/00* | (2006.01) |
| *B01J 35/02* | (2006.01) |
| *B01J 35/10* | (2006.01) |
| *C01B 39/02* | (2006.01) |

(52) U.S. Cl.
CPC ........... *C01B 39/04* (2013.01); *B01J 13/0052* (2013.01); *B01J 13/0069* (2013.01); *B01J 29/70* (2013.01); *B01J 29/7015* (2013.01); *B01J 29/84* (2013.01); *B01J 29/85* (2013.01); *B01J 35/023* (2013.01); *B01J 35/1014* (2013.01); *C01B 39/026* (2013.01); *C01B 39/48* (2013.01); *C01B 39/54* (2013.01); *B01J 2229/183* (2013.01); *B01J 2229/40* (2013.01); *C01P 2006/12* (2013.01)

(58) Field of Classification Search
CPC ...... B01J 37/04; B01J 29/7015; B01J 29/723; B01J 29/70; B01J 29/84; B01J 29/85; B01J 35/1014; C01B 39/026; C01B 39/48; C01B 39/54; C01P 2006/12
See application file for complete search history.

(56) References Cited

U.S. PATENT DOCUMENTS

| | | | |
|---|---|---|---|
| 3,030,181 | A | 4/1962 | Milton |
| 4,440,871 | A | 4/1984 | Lok et al. |
| 4,544,538 | A | 10/1985 | Zones |
| 4,961,917 | A | 10/1990 | Byrne |
| 5,466,646 | A | 11/1995 | Moser |
| 6,162,415 | A | 12/2000 | Liu et al. |
| 7,264,789 | B1 | 9/2007 | Verduijn et al. |
| 7,601,662 | B2 | 10/2009 | Bull et al. |
| 2010/0092361 | A1 | 4/2010 | Li et al. |
| 2010/0092362 | A1 | 4/2010 | Li et al. |
| 2015/0065337 | A1 | 3/2015 | Sato et al. |

FOREIGN PATENT DOCUMENTS

| | | | |
|---|---|---|---|
| CN | 104129800 A | * | 11/2014 |
| CN | 104129800 A | | 11/2014 |
| GB | 868846 A | | 5/1961 |

OTHER PUBLICATIONS

Gunniss, Principles of Particle Size Reduction and Characterization, (Jul. 2010) Microfluidics (Year: 2010).*
International Search Report dated Sep. 2, 2016.
English Language abstract of CN 104129800, Nov. 5, 2014.
Written Opinion dated Sep. 1, 2016.
Barrer, et al., "562. The hydrothermal chemistry of the silicates. Part VII. Synthetic potassium aluminosilicates" Journal of the Chemical Society, Issue 0, 1956, pp. 2882-2891.

* cited by examiner

*Primary Examiner* — David M Brunsman
(74) *Attorney, Agent, or Firm* — Baltazar Gomez (57) ABSTRACT

Zeolites, improved methods for their synthesis, and catalysts, systems, and methods of using these zeolites as catalysts are described. The method of synthesis of the zeolites includes forming a mixture including a zeolitic precursor material and a structure directing agent and subjecting the mixture to high shear processing conditions.

16 Claims, 3 Drawing Sheets

Example 1G

FIGURE 3

ZEOLITE MATERIALS AND METHODS OF MANUFACTURE

This application is a national stage of PCT/US2016/023009, filed Mar. 18, 2016 which takes the benefit of U.S. Provisional Application No. 62/135,737 filed Mar. 20, 2015 the contents of which are incorporated entirely by reference.

TECHNICAL FIELD OF THE INVENTION

The present invention pertains to the field of zeolites. More particularly, embodiments of the invention relate to improved methods for zeolite synthesis and to catalysts, systems, and methods of using these zeolites as catalysts in a variety of processes such as abating pollutants in exhaust gases.

BACKGROUND OF THE INVENTION

Zeolites have been used extensively to catalyze a number of chemical reactions in refinery and petrochemical reactions, and catalysis, adsorption, separation, and chromatography. For example, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures, have recently been noted to be of interest for use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example, as exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

The synthesis of a zeolite varies according to structure type of the zeolite, but usually, zeolites are synthesized using a structure directing agent (sometimes referred to as a template, e.g., an organic template) together with sources of silica and alumina. The structure directing agent can be in the form of an organic, e.g., tetraethylammonium hydroxide (TEAOH), or inorganic cation, e.g., $Na^+$ or $K^+$. During crystallization, the tetrahedral silica-alumina units organize around the structure directing agent to form the desired framework, and the structure directing agent is often embedded within the pore structure of the zeolite crystals.

Metal-promoted, particularly copper-promoted aluminosilicate zeolites having the CHA structure type and a silica to alumina molar ratio greater than 2, particularly those having a silica to alumina ratio greater than or equal to 5, 10, or 15 and less than about 1000, 500, 250, 100 and 50 have recently solicited a high degree of interest as catalysts for the selective catalytic reduction of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal-promoted zeolites, as described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

In view of the considerable interest in molecular sieves having 8-ring pore openings and double-six ring secondary building units, particularly those having the CHA structure type, there is an on-going desire to improve the process of preparing such zeolites.

SUMMARY OF THE INVENTION

A first aspect of the invention is directed to a method of producing a zeolitic material. In a first embodiment, a method of preparing a zeolitic material comprises the steps of: mixing at least one first zeolitic precursor material to form a synthesis gel; processing the synthesis gel at a fluid shear rate exceeding 25,000 $s^{-1}$ to provide a high shear processed gel; and hydrothermally treating the high shear processed gel to provide the zeolitic material.

In a second embodiment, the method of the first embodiment is modified, wherein the at least one first zeolitic precursor material is selected from the group consisting of a silica precursor, an alumina precursor, a phosphorus precursor, a gallium (Ga) precursor, a boron (B) precursor, an iron (Fe) precursor, a germanium (Ge) precursor, a titanium (Ti) precursor, a structure directing agent, an alkali source, seeds, and combinations thereof.

In a third embodiment, the method of the first and/or second embodiment is modified, such that the method further comprises mixing the high shear processed gel with at least one second zeolitic precursor material.

In a fourth embodiment, the method of the third embodiment is modified, wherein the at least one second zeolitic precursor material is selected from the group consisting of a silica precursor, an alumina precursor, a phosphorus precursor, a gallium (Ga) precursor, a boron (B) precursor, an iron (Fe) precursor, a germanium (Ge) precursor, a titanium (Ti) precursor, a structure directing agent, an alkali source, seeds, and combinations thereof.

In a fifth embodiment, the method of any of the second through fourth embodiments is modified, wherein the at least one first zeolitic precursor material comprises a structure directing agent and silica precursor, and wherein the structure directing agent to silica precursor molar ratio is less than 0.1.

In a sixth embodiment, the method of any of the first through fifth embodiments is modified, wherein the fluid shear rate exceeds 50,000 s$^{-1}$.

In a seventh embodiment, the method of any of the first through sixth embodiments is modified, wherein the fluid shear rate is in a range of about 50,000 s$^{-1}$ to about 150,000 s$^{-1}$.

In an eighth embodiment, the method of any of the first through sixth embodiments is modified, wherein the fluid shear rate is in a range of about 150,000 s$^{-1}$ to about 500,000 s$^{-1}$.

In a ninth embodiment, the method of any of the first through sixth embodiments is modified, wherein the fluid shear rate is in a range of about 500,000 s$^{-1}$ to about 1,000,000 s$^{-1}$.

In a tenth embodiment, the method of any of the first through sixth embodiments is modified, wherein the fluid shear rate is in a range of about 1,000,000 s$^{-1}$ to about 50,000,000 s$^{-1}$.

In an eleventh embodiment, the method of any of the first through tenth embodiments is modified, wherein the zeolitic material has a d6r unit.

In a twelfth embodiment, the method of any of the first through eleventh embodiments is modified, wherein the zeolitic material has a structure type selected from the group consisting of AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a thirteenth embodiment, the method of any of the first through twelfth embodiments is modified, wherein the zeolitic material is a 8-ring small pore molecular sieve having a structure type selected from AEI, AFT, AFX, CHA, EAB, ERI, KFI, LEV, SAS, SAT, and SAV.

In a fourteenth embodiment, the method of any of the first through thirteenth embodiments is modified, wherein the molecular sieves have a structure type selected from AEI, CHA, and AFX.

In a fifteenth embodiment, the method of any of the first through fourteenth embodiments is modified, wherein the molecular sieves have a CHA structure type.

In a sixteenth embodiment, the method of any of the first through tenth embodiments is modified, wherein the zeolitic material has a CHA structure type and is selected from the group consisting of an aluminosilicate zeolite, a borosilicate, a gallosilicate, a titanosilicate, a SAPO, an AlPO, a MeAPSO, and a MeAPO.

In a seventeenth embodiment, the method of any of the first through fifteenth embodiments is modified, wherein the molecular sieves having the CHA structure type are selected from the group consisting of SSZ-13, SSZ-62, chabazite, zeolite K-G, Linde D, Linde R, LZ-218, LZ-235, LZ-236, ZK-14, SAPO-34, SAPO-44, SAPO-47, and ZYT-6.

In an eighteenth embodiment, the method of any of the first through seventeenth embodiments is modified, wherein the zeolitic material is promoted with a metal selected from one or more of Cu, Fe, Co, Ni, La, Ce, Mn, V, and Ag.

In a nineteenth embodiment, the method of any of the first through eighteenth embodiments is modified, wherein the zeolitic material has a crystal size greater than about 0.1 micron.

In a twentieth embodiment, the method of any of the first through nineteenth embodiments is modified, wherein the zeolitic material has a zeolitic surface area and a matrix surface area, wherein the matrix surface area is less than 50 m$^2$/g.

In a twenty-first embodiment, the method of any of the first through twentieth embodiments is modified, wherein the processing occurs in a unit selected from the group consisting of a rotor/stator, colloid mill, homogenizer, high pressure homogenizer, and a microfluidizer.

A second aspect of the invention is directed to a molecular sieve. In a twenty-second embodiment, a molecular sieve having a d6r unit is prepared by the method of any of the first through twenty-first embodiments.

In a twenty-third embodiment, the molecular sieve of the twenty-second embodiment is modified, wherein the molecular sieve has a crystal size greater than about 0.1 micron.

A third aspect of the invention is directed to a catalyst material. In a twenty-fourth embodiment, a catalyst material is provided, comprising an 8-ring small pore aluminosilicate zeolite having BET surface area comprising a zeolitic surface area and a matrix surface area, wherein the matrix surface area is less than 40 m$^2$/g.

In a twenty-fifth embodiment, the catalyst material of the twenty-fourth embodiment is modified, wherein the matrix surface area is less than 30 m$^2$/g.

In a twenty-sixth embodiment, the catalyst material of the twenty-third or twenty-fourth embodiment is modified, wherein the matrix surface area is less than 25 m$^2$/g.

In a twenty-seventh embodiment, the catalyst material of any of the twenty-fourth to twenty-sixth embodiments is modified, wherein the zeolite has a structure type selected from the group consisting of AEI, AFT, AFX, CHA, EAB, ERI, KFI, LEV, SAS, SAT, and SAV.

In a twenty-eighth embodiment, the catalyst material of any of the twenty-fourth to twenty-seventh embodiments is modified, wherein the zeolite has the CHA structure type.

In a twenty-ninth embodiment, the catalyst material of any of the twenty-fourth to twenty-eighth embodiments is modified, wherein the zeolite is selected from SSZ-13 and SSZ-62.

In a thirtieth embodiment, the catalyst material of any of the twenty-fourth to twenty-ninth embodiments is modified, wherein the zeolite is exchanged with a metal selected from copper, iron, cobalt, nickel, cerium, manganese, platinum and combinations thereof, wherein the metal is present in a range of about 1 to about 10% by weight on an oxide basis.

In a thirty-first embodiment, the catalyst material of the thirtieth embodiments is modified, wherein the metal is selected from copper, iron and combinations thereof.

In a thirty-second embodiment, the catalyst material of the thirtieth or thirty-first embodiments is modified, wherein the metal is copper and is present in a range of about 2% to about 8% by weight.

In a thirty-third embodiment, the catalyst material of any of the twenty-fourth to thirty-second embodiments is modified, wherein the zeolite has a silica to alumina molar ratio in the range of about 5 to about 100.

In a thirty-fourth embodiment, the catalyst material of any of the twenty-fourth to thirty-third embodiments is modified, wherein the zeolite has a silica to alumina molar ratio in the range of about 10 to about 50.

In a thirty-fifth embodiment, the catalyst material of any of the twenty-fourth to thirty-fourth embodiments is modified, wherein the zeolite has a crystal size greater than 0.1 micron.

In a thirty-sixth embodiment, the catalyst material of any of the twenty-fourth to thirty-fifth embodiments is modified, wherein the catalyst material is disposed on a honeycomb substrate.

In a thirty-seventh embodiment, the catalyst material of any of the twenty-fourth to thirty-fifth embodiments is modified, wherein the catalyst material is disposed on a wall flow filter.

A fifth aspect of the invention is directed to a system for abating pollutants. In a thirty-eighth embodiment, a system for abating pollutants in a lean burn engine exhaust gas stream is provided, the system comprising a lean burn engine and the catalyst material of any of the twenty-fourth to thirty-sixth embodiments.

A sixth aspect of the invention is directed to a method for selectively reducing nitrogen oxides. In a thirty-ninth embodiment, a method for selectively reducing nitrogen oxides ($NO_x$) is provided, the method comprising contacting an exhaust gas stream containing $NO_x$ with a reductant and a selective catalytic reduction catalyst comprising a metal-exchanged 8-ring small pore aluminosilicate zeolite having a BET surface area comprising a zeolitic surface area and a matrix surface area, wherein the matrix surface area is less than 40 $m^2/g$.

In a fortieth embodiment, the method of the thirty-ninth embodiment is modified, wherein the zeolite has the CHA structure type and the metal comprises copper in an amount in the range of about 2% to about 8% by weight.

DETAILED DESCRIPTION OF THE INVENTION

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to zeolites, methods for their preparation, catalysts including zeolites, exhaust gas systems, and methods of abating pollutants from exhaust gases using such zeolites. Specifically, provided is a method of preparing zeolitic materials, which method comprises a high shear processing approach.

With respect to the terms used in this disclosure, the follow definitions are provided.

As used herein, the term "catalyst" or "catalyst composition" or "catalyst material" refers to a material that promotes a reaction.

As used herein, the term "catalytic article" refers to an element that is used to promote a desired reaction. For example, a catalytic article may comprise a washcoat containing a catalytic species, e.g. a catalyst composition, on a substrate.

As used herein, the term "molecular sieves" refers to zeolites and other zeolitic framework materials (e.g. isomorphously substituted materials), which may in particular form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size.

As used herein, the terms "zeolite" and "zeolitic material" refer to a specific example of a molecular sieve, further including silicon and aluminum atoms. According to one or more embodiments, it will be appreciated that by defining the molecular sieves by their structure type, it is intended to include the structure type and any and all isotypic framework materials such as SAPO, ALPO and MeAPO materials having the same framework type as the zeolitic materials.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g., zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the zeolitic materials independently comprise $SiO_4/AlO_4$ tetrahedra and are linked by common oxygen atoms to form a three-dimensional network. In other embodiments, the zeolitic materials comprise $SiO_4/AlO_4/PO_4$ tetrahedra. The zeolitic molecular sieve materials of one or more embodiments can be differentiated mainly according to the geometry of the voids which are formed by the rigid network of the ($SiO_4$)/$AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the zeolitic molecular sieve materials comprise ring sizes of no larger than 12, including 6, 8, 10, and 12.

According to one or more embodiments, the zeolitic molecular sieve materials can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the zeolitic molecular sieve materials comprise an 8-ring small pore aluminosilicate zeolite. As used herein, "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the zeolitic molecular sieve materials comprise a d6r unit. Thus, in one or more embodiments, the zeolitic molecular sieve materials have a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In specific embodiments, the zeolitic molecular sieve materials have a framework type selected from the group consisting of CHA, AEI, AFX, ERI, KFI, LEV, and combinations thereof. In still further specific embodiments, the zeolitic molecular sieve materials have a framework type selected from CHA, AEI, and AFX. In one or more very specific embodiments, the zeolitic molecular sieve materials have the CHA framework type.

Zeolitic CHA-framework type molecular sieves includes a naturally occurring tectosilicate mineral of a zeolite group with approximate formula: $(Ca,Na_2,K_2,Mg)Al_2Si_4O_{12} \cdot 6H_2O$ (e.g., hydrated aluminum silicate). Three synthetic forms of zeolitic CHA-framework type molecular sieves are described in "Zeolite Molecular Sieves," by D. W. Breck, published in 1973 by John Wiley & Sons, which is incorporated herein by reference. The three synthetic forms described by Breck are Zeolite K-G, reported in J. Chem. Soc., p. 2822 (1956), Barrer et al; Zeolite D, reported in British Patent No. 868,846 (1961); and Zeolite R, reported in U.S. Pat. No. 3,030,181, which are all incorporated herein by reference in their entireties. Synthesis of another synthetic form of zeolitic CHA framework type, SSZ-13, is described in U.S. Pat. No. 4,544,538, which is also incorporated herein by reference. Synthesis of a further synthetic form of a molecular sieve having the CHA framework type, silicoaluminophosphate 34 (SAPO-34), is described in U.S. Pat. Nos. 4,440,871 and 7,264,789, which are incorporated herein by reference. A method of making yet another synthetic molecular sieve having the CHA framework type, SAPO-44, is described in U.S. Pat. No. 6,162,415, which is incorporated herein by reference.

In one or more embodiments, the zeolitic molecular sieve materials can include all aluminosilicate, borosilicate, gallosilicate, titanosilicate, MeAPSO, and MeAPO compositions. These include, but are not limited to SSZ-13, SSZ-62, chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

In one or more embodiments, the zeolitic material has a BET surface area comprising a zeolitic surface area and a matrix surface area. As used herein, the term "matrix surface area" refers to the portion of surface area determined by the BET method that corresponds to pores larger than about 2 nm in diameter, i.e., to meso- and macro-pores. In some embodiments, the matrix surface area is less than about 50 $m^2/g$, including less than about 50 $m^2/g$, 45 $m^2/g$, 40 $m^2/g$, 35 $m^2/g$, 30 $m^2/g$, 25 $m^2/g$, 20 $m^2/g$, 15 $m^2/g$, 10 $m^2/g$ and 5 $m^2/g$. In one or more embodiments, the zeolitic surface area is greater than about 550 $m^2/g$, including greater than about 600, 700, 800, and 900 $m^2/g$.

The ratio of silica to alumina of an aluminosilicate molecular sieve component can vary over a wide range. In one or more embodiments, the zeolitic materials, independently, have a silica to alumina molar ratio (SAR) in the range of about 2 to about 300, including about 5 to about 250; about 5 to about 200; about 5 to about 100; and about 5 to about 50. In one or more specific embodiments, the zeolitic materials, independently, have a silica to alumina molar ratio (SAR) in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50.

The zeolitic materials of one or more embodiments may be subsequently ion-exchanged with one or more promoter metals such as iron, copper, cobalt, nickel, cerium, manganese, or platinum group metals (e.g., platinum). The amount of promoter metal present in such ion-exchanged zeolitic materials can vary and, in various embodiments, the promoter metal can comprise up to 10% by weight of the zeolitic material (e.g., about 0.1% to about 10% or about 1% to about 10%), on an oxide basis. For example, in certain embodiments, the metal is copper and is present in the zeolitic material in an amount of about 2% to about 8% by weight.

Synthesis of zeolites and related micro- and mesoporous materials varies according to the structure type of the zeolitic material, but typically involves the combination of several components (e.g. silica, alumina, phosphorus, alkali, structure directing agent (e.g., organic template) etc.), or zeolitic precursor materials, to form a synthesis gel, which is then hydrothermally crystallized to form a final product. As used herein, the term "zeolitic precursor material" refers to the components, e.g. silica, alumina, phosphorus, alkali metal, structure directing agent (e.g., organic template), etc., that are mixed together to produce a synthesis gel, which is then crystallized to form the final zeolitic material product. In one or more embodiments, the zeolitic precursor material is selected from a silica precursor, an alumina precursor, a phosphorus precursor, a gallium (Ga) precursor, a boron (B) precursor, an iron (Fe) precursor, a germanium (Ge) precursor, a titanium (Ti) precursor, a structure directing agent, an alkali source, seeds, and combinations thereof. As used herein, the terms "synthesis gel" or "gel" refer to a mixture of one or more zeolitic precursor material(s). In one or more embodiments, the synthesis gel may have properties resembling a gel, solid, slurry, suspension, solution, etc. Typically, the synthesis gel has properties that can be described as at least partially flowable or spreadable and the viscosity of the synthesis gel can vary greatly, e.g., from a liquid form to a thick, paste-like form.

As will be appreciated by one of skill in the art, the zeolite precursor materials can be mixed together in any order. In one or more embodiments, a silica precursor is mixed with an alumina precursor and other zeolite precursor materials. In other embodiments, a silica precursor is mixed with other zeolite precursor materials in two streams in a high shear mixer/processor to produce the synthesis gel. In yet another embodiment, zeolite precursor materials are mixed in two or more streams in a high shear mixer/processor to form the synthesis gel.

In one or more embodiments, the structure directing agent (SDA) can be in the form of an "organic template," including, but not limited to, tetraethylammonium hydroxide (TEAOH), or an inorganic cation, including, but not limited to, $Na^+$ or $K^+$. During crystallization, the tetrahedral units organize around the SDA to form the desired framework, and the SDA is often embedded within the pore structure of the zeolite crystals. In one or more embodiments, the crystallization of the zeolitic materials can be obtained by means of the addition of structure-directing agents/templates, crystal nuclei or elements. In some instances, the crystallization can be performed at temperatures of less than 100° C.

The first step, namely, combination of components and formation of the synthesis gel, is usually performed in one or two steps, and common stirring techniques (e.g., using an overhead stirrer with a variety of blades) are used to ensure the best possible homogeneity of the mixture. Although the individual synthesis components may be 100% soluble or are in a form of "clear colloids," upon combination, they very often form "synthesis gels" with increased viscosity. The common, "low shear" or "medium shear" stirring techniques, however, especially in the case of high solids/high viscosity gels, have limitations in terms of ensuring ideal homogeneity of these synthesis precursor gels. This may lead to longer reaction times, incomplete reactions (=lower yields), and even to situations where excess amounts of certain reactants (e.g., expensive SDAs such as certain organic templates) are needed to drive the reaction to desired yield.

In general, the zeolitic material prepared according to the process of one or more embodiments should exhibit comparable $NO_x$ conversion activity with the catalysts of the state of the art obtained via multi-step synthesis (copper exchange into $NH_4$-Chabazite) using traditional stirring. In general, the zeolitic material should exhibit both good low temperature $NO_x$ conversion activity ($NO_x$ conversion>50% at 200° C.) and good high temperature $NO_x$ conversion activity ($NO_x$ conversion>70% at 450° C.). The $NO_x$ activity is measured under steady state conditions at maximum $NH_3$-slip conditions in a gas mixture of 500 ppm NO, 500 ppm $NH_3$, 10% $O_2$, 5% $H_2O$, balance $N_2$ at a volume-based space velocity of 80,000 $h^{-1}$.

As used in this specification and the appended claims, the term "$Na^t$-form of chabazite" refers to the calcined form of this zeolite without any ion exchange. In this form, the zeolite generally contains a mixture of $Na^+$ and $H^+$ cations in the exchange sites. The fraction of sites occupied by $Na^+$ cations varies depending on the specific zeolite batch and recipe.

Conventional Zeolite Synthesis of CHA-Type Zeolites

In what may be referred to as a conventional synthesis of an alkali metal (for example $Na^+$ or $H^+$)-zeolitic material having the CHA structure, a source of silica, a source of alumina, and a SDA are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate or sodium aluminate, and aluminum alkoxides. Sodium hydroxide is typically added to the reaction mixture. A typical SDA for this synthesis is adamantyltrimethyl ammonium hydroxide, although other amines and/or quaternary ammonium salts may be substituted or added to the latter directing agent. The reaction mixture is heated in a pressure vessel with traditional stirring to yield the crystalline SSZ-13 product. Typical reaction temperatures are in the range of 100° C. to 200° C., and in specific embodiments, between 135° C. and 170° C. Typical reaction times are between about 1 hr. and about 30 days, and in specific embodiments, between about 10 hours and about 3 days.

At the conclusion of the reaction, optionally the pH is adjusted to between 6 and 10, and in specific embodiments, between 7 and 7.5, and the product is filtered and washed with water. Any acid can be used for pH adjustment, and in specific embodiments nitric acid is used. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 850° C. range.

Optionally $NH_4$-Exchange to Form $NH_4$-Chabazite:

Optionally, the obtained alkali metal zeolite is $NH_4$-exchanged to form $NH_4$-Chabazite. The $NH_4$-ion exchange can be carried out according to various techniques known in the art, for example, as described in Bleken, F.; Bjorgen, M.; Palumbo, L.; Bordiga, S.; Svelle, S.; Lillerud, K.-P.; and Olsbye, U. Topics in Catalysis 52, (2009), 218-228, which is incorporated herein by reference.

Synthesis of Zeolitic Materials According to Embodiments of the Invention

According to one or more embodiments, improved methods for the synthesis of zeolitic materials, particularly CHA-type aluminosilicate zeolites such as SSZ-13 and SSZ-62 are provided. It has been discovered that by using what may be referred to as a high shear processing approach to zeolite synthesis, the amount of SDA used can be reduced per kg of zeolite product obtained during synthesis. As will be appreciated, any reduction in the cost of the raw materials such as the amount of expensive SDA will have a significant positive impact on the overall production cost of this material. In one or more embodiments, the high shear approach results in up to a 30% reduction, including a reduction in the range of from about 0.1% to about 30%, in the amount of SDA (e.g., organic template) used, when compared to using the same precursor material(s) and synthesis gel that has not been subjected to high shear processing.

The high shear approach uses a "high shear" process to manufacture the zeolitic material. The high shear rate can produce desirable zeolite attributes, such as improved crystallinity, crystal size, and morphology. More specifically, the high shear approach allows control of the morphological properties of the zeolitic material. For example, crystal size and shape can be controlled. In one or more embodiments, a zeolitic material is prepared having a crystal size greater than about 0.1 microns (e.g., between about 0.1 and about 0.5 microns) or greater than about 0.5 microns, including greater than 0.75 microns, greater than 1.0 micron, greater than 1.5 microns, greater than 2.0 microns, and greater than 5.0 microns. Furthermore, the high shear approach produces beneficial effects on both zeolitic surface area and matrix surface area. Zeolitic surface areas of greater than 550 $m^2/g$ can be achieved. Matrix surface areas of less than about 50 $m^2/g$ can be achieved, including less than about 50, 45, 40, 35, 30, 25, 20, 15, 10, and 5 $m^2/g$.

As used herein, the terms "low shear" and "medium shear" refer to stirring at a shear rate of less than 25,000/second (25,000/s or 25,000 $s^{-1}$). Conventional homogenizers, closed rotors, sawtooth blades and agitators that produce shear rates below 25,000/s are not believed to be suitable to produce zeolites according to embodiments of the invention. In one more embodiments, shear rates exceeding 25,000/s, preferably in the range of about 50,000/s to about 150,000/s, and preferably in the range of about 150,000/s to about 500,000/s, preferably about 500,000/s to about 1,000,000/s, preferably in the range of about 1,000,000/s to about 50,000,000/s can be utilized. In specific embodiments, the process increases the viscosity of the mixture compared to the mixture viscosity prior to shearing. In specific embodiments, in-line mixers that can be placed in line in a zeolite manufacturing process are desirable to use. In-line rotor/stator mixers utilize a single, dual or four stage rotor that turns at high speed within a stationary stator. As the rotating blades pass the stator, they mechanically shear the contents at shear rates on the order of 500,000/s. Examples of such a high shear rotor/stator mixer include, without limitation, an X-series Ultra-high shear mixer available from Charles Ross & Son Company, Hauppauge, N.Y., a Megatron-series from Kinematica Inc., Luzern Switzerland. Colloid mills also produce shear rates on the order of 500,000/s. High shear homogenizers that produce shear rates in the range of 500,000/s to 700,000/s may also be utilized according to embodiments of the invention.

In specific embodiments, a microfluidizer processor is used to provide shears in excess of 700,000/s and in some embodiments in excess of 1,000,000/s, and in specific embodiments, in excess of 10,000,000/s. A specific microfluidizer is available from Microfluidics, of Newton, Mass. Such a microfluidizer utilizes forces of shear, impact, and occasionally cavitation to provide a shear processed mixture of at least one precursor (e.g., an SDA), an alumina source and a silica source. It will be understood that, for certain zeolite manufacturing processes, it may be desirable to include an alkali source in the mixture, for example NaOH. The mixing process occurs at high energy intensity levels within an interaction chamber. The mixing process can include a Z-type chamber or a Y-type chamber that delivers the mixture of the SDA, alumina source, and silica source to a high energy impact zone and a high shear zone within the chamber. The high shear zone is typically a microchannel downstream from a high pressure inlet. Once passing through the high shear zone or microchannel, the mixture typically encounters the high energy impact zone en route to a low pressure outlet. As the skilled artisan will appreciate, in the Z-type chamber, the inlet, microchannel and outlet are configured in the shape of the letter "Z". The Y-type chamber includes a high pressure inlet that splits into two conduits in the shape of the letter "Y". The two conduits each deliver fluid to a high shear zone, and the mixture can flow to a high energy impact zone and then to a low pressure outlet. The microfluidizer utilizes turbulent mixing, localized energy dissipation, and a fixed geometry to create a uniform pressure profile for accurate and repeatable size distributions. Inside the chamber, the mixture experiences high flow velocities and shear. The microchannels are as small as 50 μm and as large as 500 μm and this creates micro volumes that collectively experience a pressure profile (up to 275 MPa/2750 bar/40,000 psi) and thus, a uniform application of shear. Advantageously, such a microfluidizer can be an in-line high shear mixer to provide a continuous manufacturing process. "In-line" means that the high shear mixer can be placed in an existing process. For example, the mixture may be pre-mixed upstream of the high shear mixture, then pumped to the high shear mixer, and after processing in the high shear mixer, the high shear processed mixture can be pumped to an autoclave or other suitable apparatus for hydrothermal processing to form the zeolite.

In a manufacturing process, the microfluidizer typically includes multiple microchannels or "slots" in parallel to provide an acceptable flow rate for high volume manufacturing. An auxiliary processing module with larger microchannels can be placed in series upstream from a first microfluidizer to break up large gel particles prior to entering the microfluidizer. The microfluidizer processor acts as a large pump that forces material through a very small orifice. The pressures of operation start around 3.4 MPa/500 psi and go as high as 275 MPa/40,000 psi. These conditions break up any particle aggregates formed during initial combination of the components, and thus allow for ultimate intimate mixing and superior homogeneity as compared to the traditional stirring/mixing methods.

As mentioned above, high-shear processing can provide one or more of the following desirable attributes: a reduction in the use of the expensive SDA (e.g., organic template), shorter crystallization times and/or lower crystallization temperatures, better application performance of the product material, better ion-exchange properties and possible new and unique crystal morphology.

In this synthesis process, all or only select synthesis components may be high-shear processed prior to the crystallization, and repeated processing with incrementally more components is also possible.

Ion Exchange of Metal

In specific embodiments, a suitable metal ion is exchanged into the zeolitic material in order to promote the zeolitic material. As used herein, "promoted" refers to a component that is intentionally added to the zeolitic material, as opposed to impurities inherent in the zeolitic material. Thus, a promoter is intentionally added to enhance activity of a catalyst compared to a catalyst that does not have promoter intentionally added. In order to promote the SCR of oxides of nitrogen, in one or more embodiments, a suitable metal is exchanged into the zeolitic material. According to one or more embodiments, the zeolitic material is promoted with a metal selected from Cu, Fe, Co, Ni, La, Ce, Mn, V, Ag, and combinations thereof. In specific embodiments, the catalyst is promoted with Cu, Fe, and combinations thereof.

In one or more embodiments, the promoter metal can be ion exchanged into the zeolitic material. The metal can be exchanged after the preparation or manufacture of the zeolite. The metal can be associated with the zeolite in ways other than ion exchange.

Copper-Exchange into to Alkali Metal or $NH_4$-Chabazite to Form Metal-Chabazite:

In specific embodiments, copper is ion exchanged into alkali metal, proton form, $NH_4$-Chabazite, or a combination thereof to form Cu-Chabazite. When copper acetate is used as the copper source, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar.

According to an embodiment of the present invention, zeolitic material of the invention is used in a catalytic process, for example, as a catalyst and/or catalyst support, and more specifically as a catalyst. In general, the zeolitic material of the invention can be used as a catalyst and/or catalyst support in any conceivable catalytic process, wherein processes involving the conversion of at least one organic compound, more specifically of organic compounds comprising at least one carbon-carbon and/or carbon-oxygen and/or carbon-nitrogen bond, more specifically of organic compounds comprising at least one carbon-carbon and/or carbon-oxygen bond, and even more specifically of organic compounds comprising at least one carbon-carbon bond. In particularly specific embodiments of the present invention, the zeolitic material is used as a catalyst and/or catalyst support in any one or more of methanol-to-olefin (MTO) reactions and ethylene-to-propylene (ETP) reactions, as well as in the co-reaction of methanol and ethylene (CME). The processes involve contacting the compounds with the catalysts according to embodiments of the invention.

According to a further embodiment of the present invention, the zeolitic material of the invention is used in a catalytic process involving the conversion of at least one compound comprising at least one nitrogen-oxygen bond. According to one or more embodiments of the present invention, the zeolitic material is used as a catalyst and/or catalyst support in a selective catalytic reduction (SCR) process for the selective reduction of nitrogen oxides $NO_x$; for the oxidation of $NH_3$, in particular for the oxidation of $NH_3$ slip in diesel systems; and for the decomposition of $N_2O$. The term nitrogen oxides, $NO_x$, as used in the context of the present invention, designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), and nitrogen peroxide ($NO_3$). According to particularly specific embodiments of the present invention, the zeolitic material used in a catalytic process involving the conversion of at least one compound comprising at least one nitrogen-oxygen bond comprises Cu and/or Fe, and more specifically Cu. The process can be accomplished by contacting the compound with a catalytic zeolitic material according to an embodiment of the invention.

Therefore, the present invention also relates to a method for selectively reducing nitrogen oxides $NO_x$ by contacting a stream containing $NO_x$ with a catalyst containing the zeolitic material according to the present invention under suitable reducing conditions; to a method of oxidizing $NH_3$, in particular of oxidizing $NH_3$ slip in diesel systems, by contacting a stream containing $NH_3$ with a catalyst containing the zeolitic material having an CHA-type framework structure according to the present invention under suitable oxidizing conditions; to a method of decomposing $N_2O$ by contacting a stream containing $N_2O$ with a catalyst containing the zeolitic material under suitable decomposition conditions; to a method of controlling emissions in Advanced Emission Systems such as Homogeneous Charge Compression Ignition (HCCI) engines by contacting an emission stream with a catalyst containing the zeolitic material under suitable conditions; to a fluid catalytic cracking (FCC) process wherein the zeolitic material is employed as an additive; to a method of converting an organic compound by contacting said compound with a catalyst containing the zeolitic material under suitable conversion conditions; and to a "stationary source" process wherein a catalyst is employed containing the zeolitic material.

Accordingly, embodiments of the present invention also relate to a method for selectively reducing nitrogen oxides $NO_x$, wherein a gaseous stream containing nitrogen oxides $NO_x$, specifically also containing ammonia and/urea, is contacted with the zeolitic material according to the present invention or the zeolitic material obtainable or obtained according to the present invention, for example, in the form of a molded catalyst, specifically as a molded catalyst wherein the molecular sieve material is deposited on a suitable refractory carrier, still more specifically on a "honeycomb" carrier/substrate.

The nitrogen oxides which are reduced using a catalyst containing the zeolitic material obtainable or obtained according to embodiments of the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

In specific embodiments, the zeolitic material or the zeolitic material obtainable or obtained according to embodiments of the present invention is used as a molded catalyst, still more specifically as a molded catalyst wherein the zeolitic material is deposited on a suitable refractory substrate, still more specifically on a "honeycomb" substrate, for the selective reduction, e.g., SCR of nitrogen oxides $NO_x$. According to embodiments of the invention, the SCR catalyst can be in the form of self-supporting catalyst particles or as a honeycomb monolith formed of the SCR catalyst composition. In one or more embodiments of the invention, however, the SCR catalyst composition is disposed as a washcoat or as a combination of washcoats on a ceramic or metallic substrate, for example a honeycomb flow through substrate or wall flow filter substrate. In particular, the selective reduction of nitrogen oxides is effected in a system wherein the zeolitic material according to an embodiment of the present invention is employed as catalytically active material in the presence of ammonia or urea. While ammonia is the reducing agent of choice for stationary power plants, urea is the reducing agent of choice for mobile SCR systems. Typically, the SCR system is integrated in the engine and vehicle design and, also typically, contains the following main components: an SCR catalyst containing the zeolitic material according to an embodiment of the present invention; a urea storage tank; a urea pump; a urea dosing system; a urea injector/nozzle; and a respective control unit. In a specific embodiment, the SCR catalyst is disposed as a washcoat on a honeycomb substrate such as a flow through substrate or wall flow substrate.

In other specific embodiments, a catalyst system is provided that includes an oxidation catalyst upstream of the SCR catalyst, the oxidation catalyst comprising a platinum group metal catalyst on a flow through substrate. Typically, a filter is provided upstream of the SCR catalyst as well, the filter being a wall flow filter. The wall flow filter may be uncatalyzed or catalyzed with a platinum group metal catalyst. In a very specific embodiment, a system comprises, in order, a diesel oxidation catalyst on a flow through substrate, a wall flow filter, a reductant injector, and an SCR catalyst on a flow through substrate. In other embodiments, the SCR catalyst may be placed on the wall flow filter, which may eliminate the need for an SCR catalyst on a flow through honeycomb substrate. The systems may also include an ammonia oxidation (AMOX) cleanup catalyst downstream from the SCR catalyst to remove any ammonia that slips through the SCR catalyst.

More specific embodiments pertain to the use of a catalyst containing the zeolitic material according to the present invention or the zeolitic material obtainable or obtained according to the inventive high shear approach, for removal of nitrogen oxides $NO_x$ from exhaust gases of lean burn internal combustion engines, in particular diesel engines, which operate at combustion conditions with air in excess of that required for stoichiometric combustion, i.e., in a lean operation mode.

Therefore, embodiments the present invention also relate to methods for removing (e.g., selectively reducing) nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the high shear approach of the present invention is employed as catalytically active material.

Embodiments of the present invention therefore relate to the use of the zeolitic material of the invention, in particular in the field of catalysis and/or in the treatment of exhaust gas, wherein said exhaust gas treatment comprises industrial and automotive exhaust gas treatment. In these and other applications, the zeolitic material of the present invention can, by way of example, be used as a molecular sieve, catalyst, and/or catalyst support.

EXAMPLES

Example 1—Preparation of Molecular Sieve Compositions and Articles

A CHA powder catalyst was prepared by crystallization of chabazite using an ADAOH (Trimethyl-1-adamantylammonium hydroxide)-containing synthesis gel, separation of the chabazite product, drying and calcination to remove the SDA/organic template (ADAOH). Water, ADAOH solution, and aqueous sodium hydroxide were added into the make-down tank and mixed for several minutes. An aluminum source was then added over a period of 3-5 minutes. The mixture was allowed to stir for about 30 minutes or until the aluminum source is mostly dissolved. Colloidal silica was then added with stirring over a period of about 5 minutes. Mixing was continued for an additional 30 minutes, resulting in a viscous gel of uniform composition. The gel was transferred to an autoclave. The autoclave was heated to 170° C., and crystallization was continued for 18 hours while maintaining agitation of the gel. The reactor was cooled to <50° C. and vented to atmospheric pressure prior to unloading. The suspension was admixed with deionized water and was filtrated with a porcelain suction filter. The wet product was then heated at a temperature of 120° C. in air for 4 hrs. The dried product was then further calcined in air at 600° C. for 5 hrs to remove the template and ensure a carbon content of less than 0.1 wt. %.

Optionally, the resulting synthesis gel or at least partial components of the gel were processed using a high shear homogenizer, where the homogenizer was either a high pressure (High P) type or a Rotor/Stator type. Seeds can be also used in the processed gels. The gel was then transferred to the autoclave. The autoclave was heated to 170° C., and crystallization was continued for 10-30 hours while maintaining agitation of the gel. The reactor was cooled to ambient temperature and vented to atmospheric pressure prior to unloading. The suspension was admixed with deionized water and was filtered using a porcelain suction filter. The wet product was then heated at a temperature of 120° C. in air for 4 hrs. The dried product was then further calcined in air at 600° C. for 5 hrs. to remove the template and ensure a carbon content of less than 0.1 wt. %. The runs are summarized in Table 1 below.

TABLE 1

Summary of chabazite crystallization runs with and without synthesis gel high shear pre-processing

| Ex. # | High shear pre-processing (Y/N) | Full gel/Partial components processed | Estimated shear ($s^{-1}$) | Template Use (%) | Crystallization time (%) | Morphlogy* | Crystal Size* (micron) |
|---|---|---|---|---|---|---|---|
| 1A (Comp) | N | n.a. | n.a. | 100 | 100 | small crystals | ~0.1-0.2 |
| 1B | Y | Full | 25,000 | 100 | 100 | small crystals | ~0.1-0.2 |
| 1C | Y | Full | 87,000 | 100 | 67 | small crystals | ~0.1-0.2 |
| 1D | Y | Full | 87,000 | 90 | 67 | small crystals | ~0.1-0.2 |
| 1E | Y | Full | 500,000 | 100 | 70 | small crystals | ~0.1-0.2 |
| 1F | Y | Full | 1,500,000 | 100 | 100 | large angular crystals | ~1.5 |
| 1G | Y | Full/diluted 1:1 for crystallization | 2,500,000 | 100 | 100 | Medium "ball"-like crystals | ~0.9 |

TABLE 1-continued

Summary of chabazite crystallization runs with and without synthesis gel high shear pre-processing

| Ex. # | High shear pre-processing (Y/N) | Full gel/ Partial components processed | Estimated shear ($s^{-1}$) | Template Use (%) | Crystallization time (%) | Morphlogy* | Crystal Size* (micron) |
|---|---|---|---|---|---|---|---|
| 1H | Y | Partial/ (ADAOH + silica) | 6,000,000 | 75 | 100 | small crystals | ~0.1-0.2 |

Figure 1:
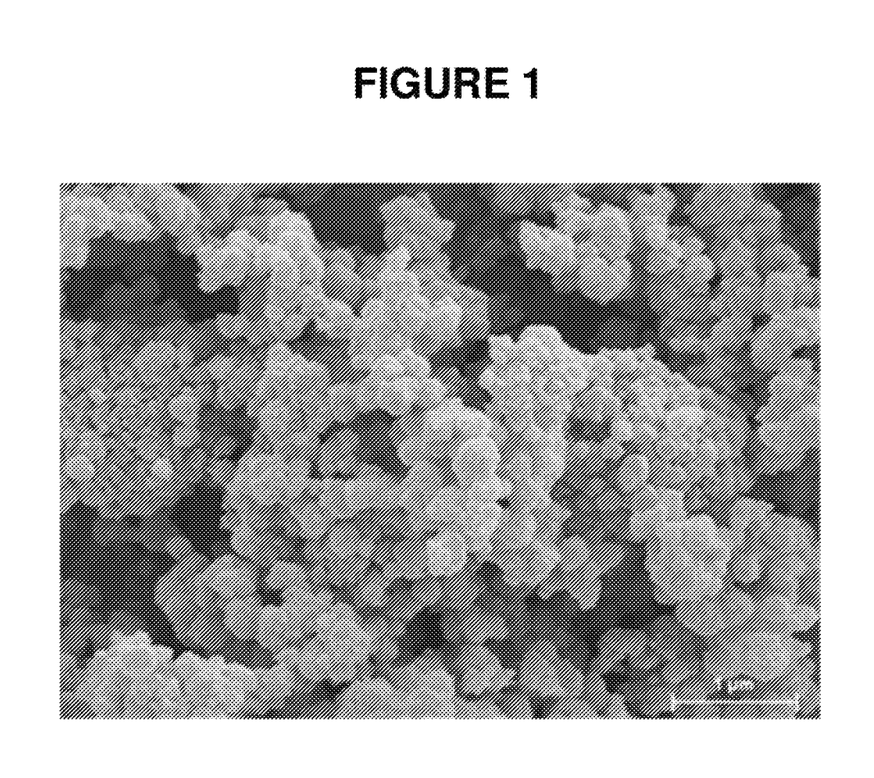
FIG. 1 is an SEM photograph of a zeolite prepared according to the Examples.
Figure 2:
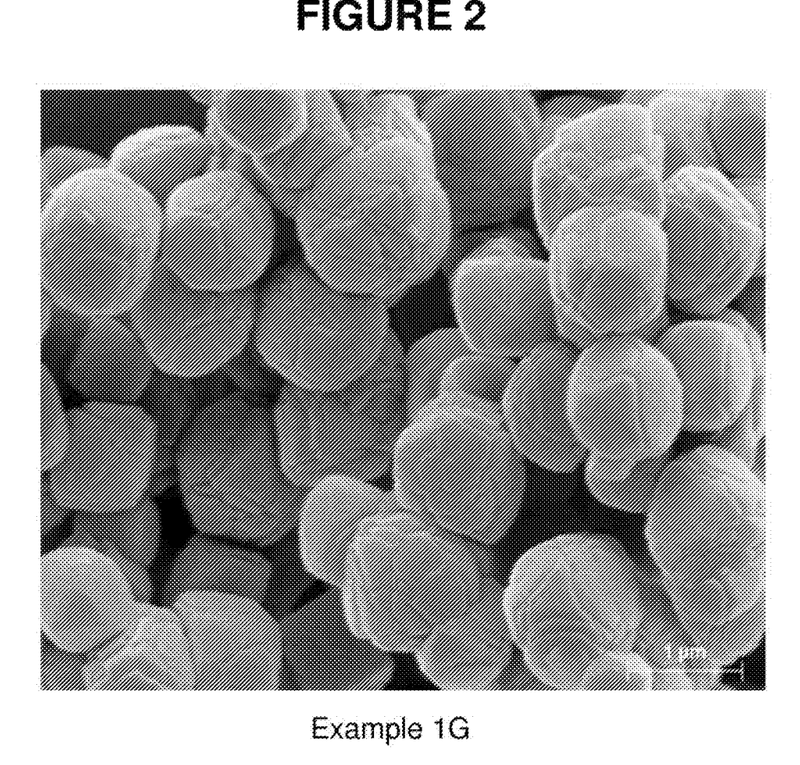
FIG. 2 is an SEM photograph of a zeolite according to an embodiment of the invention.
Figure 3:
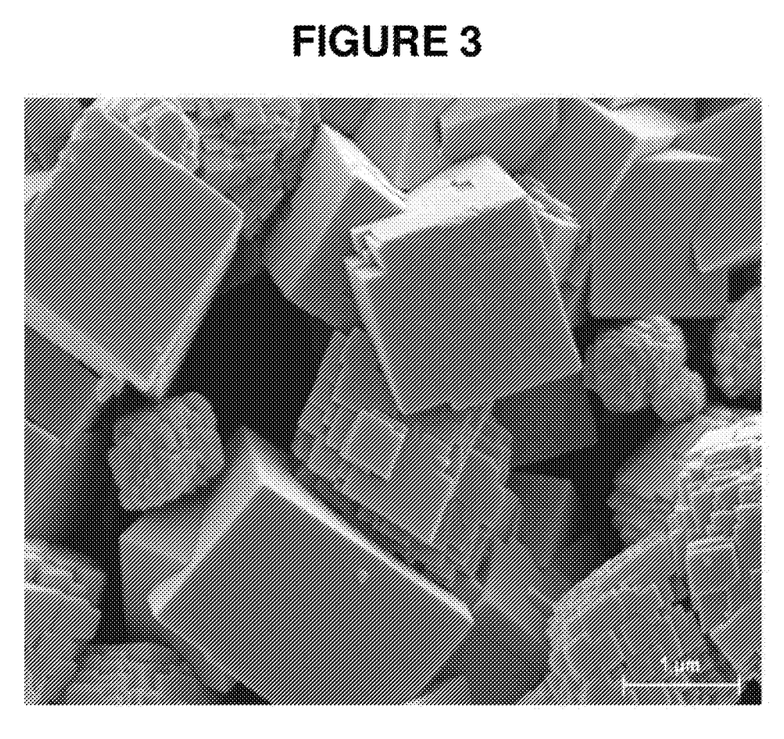
FIG. 3 is an SEM photograph of a zeolite according to an embodiment of the invention.

*see FIGS. 1-3. It is noted that all of the Examples reached "full" crystallization.

Example 2—SEM Analysis of Samples

The Examples were examined under a Scanning Electron Microscope (SEM). FIGS. 1-3 show a comparison of the morphology and crystal size of the chabazite products obtained using traditional synthesis and synthesis involving high shear pre-processing of the synthesis gel or its partial components. FIG. 1 shows the morphology for a chabazite product obtained using traditional stirring/mixing (Example 1A Comparative), resulting in small crystals. FIG. 2 shows the morphology for a chabazite product obtained using high shear pre-processing of the synthesis gel of Example 1G, resulting in medium "ball"-like crystals. FIG. 3 shows the morphology for a chabazite product obtained using high shear pre-processing of the synthesis gel of Example 1F, resulting in large angular crystals.

As illustrated in Table 1, Examples 1B-1E and Example 1H produce CHA structure type crystals having a similar morphology to the CHA structure type crystals of Example 1A. Increasing the shear to greater than 25,000 $s^{-1}$ results in a significant reduction in the crystallization time (Examples 1C-1E). Example 1D illustrates that increasing the shear to greater than 25,000 $s^{-1}$ not only reduces the crystallization time, but also allows a reduction in the amount of SDA/ template used. In Examples 1F and 1G, shear rates of greater than 500,000 $s^{-1}$ result in crystals having a morphology that is distinct from crystals prepared by traditional stirring/ mixing. Examples 1F and 1G have crystal sizes greater than 0.5 microns. Example 1H illustrates that when partial components of the synthesis gel are processed at shear rates greater than 2,500,000 $s^{-1}$, at least 25% less SDA/template can be used, resulting in a CHA material with a morphology similar to the CHA material prepared by traditional stirring/ mixing (Example 1A).

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of producing a zeolitic material, the method comprising the steps of:
    mixing at least one first zeolitic precursor material to form a synthesis gel;
    processing the synthesis gel at a fluid shear rate in the range of 25,000 $s^{-1}$ to 500,000 $s^{-1}$ or a fluid shear rate in a range of 150,000 $s^{-1}$ to 500,000 $s^{-1}$ to provide a high shear processed gel; and
    hydrothermally treating the high shear processed gel to provide the zeolitic material wherein the zeolitic material has a matrix surface area of less than 50 $m^2/g$.

2. The method of claim 1, wherein the at least one first zeolitic precursor material is selected from the group consisting of a silica precursor, an alumina precursor, a phosphorus precursor, a gallium (Ga) precursor, a boron (B) precursor, an iron (Fe) precursor, a germanium (Ge) precursor, a titanium (Ti) precursor, a structure directing agent, an alkali source, seeds, and combinations thereof.

3. The method of claim 2, wherein the at least one first zeolitic precursor material comprises a structure directing agent and silica precursor, wherein the structure directing agent to silica precursor molar ratio is less than 0.1.

4. The method of claim 1, further comprising mixing the high shear processed gel with at least one second zeolitic precursor material.

5. The method of claim 4, wherein the at least one second zeolitic precursor material is selected from the group consisting of a silica precursor, an alumina precursor, a phosphorus precursor, a gallium (Ga) precursor, a boron (B) precursor, an iron (Fe) precursor, a germanium (Ge) precursor, a titanium (Ti) precursor, a structure directing agent, an alkali source, seeds, and combinations thereof.

6. The method of claim 1, wherein the fluid shear rate exceeds 50,000 $s^{-1}$.

7. The method of claim 1, wherein the fluid shear rate is in a range of about 50,000 $s^{-1}$ to about 150,000 $s^{-1}$.

8. The method of claim 1, wherein the fluid shear rate is in a range of about 150,000 $s^{-1}$ to about 500,000 $s^{-1}$.

9. The method of claim 1, wherein the zeolitic material has a d6r unit.

10. The method of claim 9, wherein the zeolitic material has a structure type selected from the group consisting of AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

11. The method of claim 10, wherein the zeolitic material is an 8-ring small pore molecular sieve having a structure type selected from the group consisting of AEI, AFT, AFX, CHA, EAB, ERI, KFI, LEV, SAS, SAT, and SAV.

12. The method of claim 11, wherein the molecular sieves have a structure type selected from AEI, CHA, and AFX.

13. The method of claim 12, wherein the molecular sieves have a CHA structure type.

14. The method of claim 13, wherein the molecular sieves having the CHA structure type are selected from the group consisting of SSZ-13, SSZ-62, chabazite, zeolite K-G, Linde D, Linde R, LZ-218, LZ-235, LZ-236, ZK-14, SAPO-34, SAPO-44, SAPO-47, and ZYT-6.

15. The method of claim 1, wherein the zeolitic material has a CHA structure type and is selected from the group consisting of an aluminosilicate zeolite, a borosilicate, a gallosilicate, a titanosilicate, a SAPO, an AlPO, a MeAPSO, and a MeAPO.

16. The method of claim 1, wherein the zeolitic material is promoted with one or more metals selected from the group consisting of Cu, Fe, Co, Ni, La, Ce, Mn, V, and Ag.

* * * * *